US012671212B1

(12) United States Patent
Dwayne Crumholt

(10) Patent No.: US 12,671,212 B1
(45) Date of Patent: Jun. 30, 2026

(54) WELDING LEAD SAFETY SYSTEM

(71) Applicant: Justin Dwayne Crumholt, St Amant, LA (US)

(72) Inventor: Justin Dwayne Crumholt, St Amant, LA (US)

( * ) Notice: Subject to any disclaimer, the term of this patent is extended or adjusted under 35 U.S.C. 154(b) by 0 days.

(21) Appl. No.: 19/355,391

(22) Filed: Oct. 10, 2025

Related U.S. Application Data

(60) Provisional application No. 63/733,443, filed on Dec. 13, 2024.

(51) Int. Cl.
| | |
|---|---|
| *H01R 13/631* | (2006.01) |
| *B23K 9/32* | (2006.01) |
| *H01R 13/447* | (2006.01) |
| *H01R 13/627* | (2006.01) |

(52) U.S. Cl.
CPC ............. *H01R 13/631* (2013.01); *B23K 9/32* (2013.01); *H01R 13/447* (2013.01); *H01R 13/627* (2013.01); *H01R 13/6277* (2013.01); *H01R 13/6278* (2013.01)

(58) Field of Classification Search
CPC .............. H01R 13/631; H01R 13/6271; H01R 13/447; H01R 13/639; H01R 13/6397; H01R 4/70; H01R 13/5213; H01R 9/11; H01R 33/97; H01R 33/971; H01R 13/6275; H01R 13/6277; H01R 13/6278; B23K 9/32
See application file for complete search history.

(56) References Cited

U.S. PATENT DOCUMENTS

| | | | |
|---|---|---|---|
| 5,506,922 | A | 4/1996 | Grois et al. |
| 6,338,644 | B1 | 1/2002 | Fritzinger et al. |
| 7,077,681 | B2 | 7/2006 | Behoo |
| 9,819,115 | B2 * | 11/2017 | Markefka .......... H01R 13/5213 |
| 11,177,584 | B1 | 11/2021 | Pearman et al. |
| D1,023,958 | S | 4/2024 | Pearman et al. |
| 11,951,573 | B2 | 4/2024 | Pearman et al. |
| 11,964,347 | B2 | 4/2024 | Pearman et al. |
| 12,186,837 | B2 | 1/2025 | Pearman et al. |
| 12,350,759 | B2 | 7/2025 | Pearman et al. |

FOREIGN PATENT DOCUMENTS

EP 3249756 A1 * 11/2017 ......... H01R 13/5213

* cited by examiner

*Primary Examiner* — Renee S Luebke
*Assistant Examiner* — Paul D Baillargeon
(74) *Attorney, Agent, or Firm* — Advantage IP Law Firm; Michael S Doll

(57) ABSTRACT

A welding lead safety system having a pair of complementary couplings connected to or integrally formed on a pair of complementary male and female welding leads with one of the couplings incorporating a pivotally mounted safety cap to releasably engage the other coupling, the couplings cooperating to provide both a lead separation prevention mechanism as well as an arc prevention feature by assuming one of three positions.

23 Claims, 13 Drawing Sheets

WELDING LEAD SAFETY SYSTEM

CROSS-REFERENCE TO OTHER APPLICATIONS

This application claims the benefit of U.S. provisional patent Application No. 63/733,443, filed on Dec. 13, 2024, titled Arc Guard, and which is hereby incorporated by reference in its entirety.

BACKGROUND

1. Field of the Disclosure

The disclosure relates broadly to welding systems, and more specifically, to welding lead safety systems that may be used across a plurality of different welding leads to prevent accidental decoupling of male and female leads and address inadvertent arcing concerns from exposed live lead connectors.

2. Background Art

While there are many varieties of welding techniques, arc welding is one of the most common methods. Arc welding technology typically uses a high-powered electrical arc emanating from an electrode to melt a grounded metal workpiece. Electrical arcing occurs when electric current jumps a gap and flows through the air between two conductors. In this case, the conductors include the metal workpiece and the electrode, both of which have a strong electrical current fed to them through the welding machine. To establish the arc, a circuit must be created between the welding machine and the workpiece. This typically requires a welding machine and a pair of welding leads.

To establish the circuit, the welding machine is coupled to a proper power source. To conduct an electrical current from the welding machine, welding leads are typically used including a workpiece-side lead and an electrode-side lead. The workpiece lead is coupled to a negative terminal of the welding machine at one end either by clamping to, plugging into, or otherwise being secured to the terminal or terminal opening. The other end of the workpiece lead is then clamped or otherwise connected to the workpiece. The electrode lead is connected to a positive terminal of the welding machine by a similar connection mode as the workpiece lead but to the positive terminal or terminal opening. The other end of the electrode lead is clamped onto an electrode such as a welding stick or plugged into a welding gun. The workpiece lead and the electrode lead typically have male and/or female connectors allowing for attachment of welding lead extensions and/or welding whips to provide greater freedom of movement and range and/or connecting to a variety of welding implements. A welding whip typically refers to a tool used in welding to manipulate the welding arc or to control the movement of the welding torch. Some of these welding lead connectors are simple clamp or plug in varieties to connect to the welding machine terminals or leads. Other welding lead connectors are of the plug and twist variety such as a found on Tweco-style Positive Cam connectors, for example. With the circuit lead connectors and workpiece setup properly, the welding machine is powered on. The welding current passes through the welding leads to creating an electric arc between the electrode side welding device and the workpiece when placed in close proximity with the arc spanning the gap therebetween.

Welding leads are made of metal, and they are typically covered with a layer of insulation. The insulation protects the operator from electrical shock and helps to prevent the welding current from shorting out. However, such insulation does not prevent a highly conductive exposed female lead connector coupled to a powered welding machine from inadvertently arcing and thus poses a significant danger of electrocution to the user and/or burns to surrounding objects. Risks of explosions from arcing in proximity to gases are also a potential hazard. Given the dangers of an exposed live female lead connector, several attempts have been offered as solutions to protect the users from inadvertent arcing, especially when the female end of a welding lead is not engaged with the male end of a welding whip or another section of welding lead.

One such attempt is found in U.S. Pat. No. 11,177,584 to Pearman et al. The '584 Pearman device comprises a single female welding lead connector with an elongated main body terminating in a first end and an opposing second end. Proximate the first end is a safety cover hingedly coupled to the main body of the female welding lead connector. The safety cover includes a two-pronged clip extending therefrom to engage a complementary gap in the main body to fasten the cover to the main body and cover the female end of the female welding lead connector. However, the '584 Pearman device lacks a complementary component on the male lead connector for ensuring the male and female leads remain connected in the first place, Thus, inadvertent separation of the leads due to twisting, suspension, and/or dropped equipment relies solely on the more tenuous connection between the male and female connectors of the welding leads. In addition, the '584 Pearman device requires a modified female connector lead and is not removable such that this device is not universal for application across a number of different welding lead connectors.

Another later attempt is found in U.S. Pat. No. 12,186,837 also to Pearman et al. The approach in this patent focuses on a more universal application for more common lead constructions having an outer surface combining a series of grooves and bulges. However, this approach requires a collar with a number of internally facing grooves to be slid onto an existing female connector lead by matching a series of grooves with bulges on the external surface of the female lead connector or vice versa. Thus, such collar is retained using a frictional resistance only while the groove and bulge mating resists rotation of the collar about the lead connector. However, as with the prior Pearman '584 patent, such device provides no mating capability with a complementary male lead connector and presents the same disconnection concerns. In addition, the slip fit relies solely on friction to retain the collar on the female lead connector and thus may slip off during use, especially as the external surface of the lead gets worn down over time. The bulge and groove construction within the internal surface of the collar also may not work with leads that do not include such a complementary outer surface construction. Thus, the '837 Pearman device is dependent on the lead outer surface constructed and restricted in its application.

Another approach, also to Pearman et al., may be found in U.S. Pat. No. 11,964,347. In this patent, a collar constructed to slide over the female lead connector includes a flexible tether connected to plug that may be inserted into the female lead connector and cap off that connector to prevent arcing. Such device is dependent on the friction of the plug insert relative to the female connector to ensure coverage of the female connector, requires a very specific alignment, and has a relatively thin tether connecting the collar to the plug.

As with the other Pearman constructions above, connection between the male and female connectors is not addressed.

One other approach involves the mating of two welding lead connectors using a threaded coupling such as that found in U.S. Pat. No. 11,951,573 to Pearman et al. This solution requires the addition of three hollow members that slip fit over the lead connectors. Two of the hollow members are threaded and may be threadably coupled together about the third hollow members. When assembled together, the three hollow members restrict the joined welding lead connectors from being disconnected. While such construction secures the two leads together, fastening and unfastening is cumbersome and the parts are free to slide along the length of the leads requiring the user to position each of the three hollow parts each time in use. In addition, once disconnected, there is no protection against inadvertent arcing as the female connector is exposed.

With respect to these foregoing Pearman approaches, none of them address preventing inadvertent decoupling of a male lead connector from the female lead connector while also providing the safety feature of a cover when the two leads are disconnected across a variety of welding lead constructions. Thus, given the drawbacks of the prior approaches, there exists a need for an improved welding lead safety system that inhibits inadvertent decoupling of the male and female lead connectors while also providing a safety feature to prevent inadvertent arcing of a live lead that also allows for a broader universal application across a variety of welding lead constructions.

SUMMARY

In accordance with one or more embodiments a welding lead safety system for use with a female welding lead with a recessed substantially hollow female lead connector and a complementary male welding lead with a protruding male lead connector may comprise a pair of complementary sleeves constructed to slip fit over the welding leads and be releasably fixed in place, one of the sleeves includes a capture gap circumferentially extending around at least a portion of an outermost perimeter of the sleeve while the other sleeve includes a pivotally connected safety cap with a catch to releasably engage the capture gap, the cap being movable between a capture position wherein the catch at least partially resides within a portion of the capture gap restricting the associated lead connectors from being drawn apart once connected together, a release position wherein the catch resides outside the capture gap allowing the welding lead connectors to be separated, and a cover position wherein the cap rotates to cover an opening of the female welding lead thereby preventing inadvertent arcing events.

In another embodiment, the capture gap is bounded by a pair of opposing ridges with one of the ridges being constructed to drive the catch into the capture gap as the two sleeves are brought together.

Another feature of one or more of the embodiments disclosed herein is the ability to rotate the sleeves relative to one another with the catch residing in the capture gap.

Yet another feature of one or more of the embodiments disclosed herein is the incorporation of a biasing element to ensure the safety cap closes over an exposed end of the female welding lead when the sleeves are decoupled from one another and the leads separated.

In yet another embodiment, a kit for use with a pair of welding leads is disclosed.

In another embodiment, a welding lead safety system incorporating a first welding lead end with a male connector body having at least one ridge extending circumferentially around at least a portion of the male connector body and a second welding lead end with a female connector body having at least one mounting arm affixed to the outermost surface of the female connector body, the arm extending outwardly and pivotally connecting to a safety cap with a catch extending therefrom, the cap being movable between a capture position wherein the catch releasably engages at least one surface of the at least one ridge restricting the associated lead ends from being drawn apart once connected together while also allowing the lead ends to be rotated relative to one another, a release position wherein the catch is free of interference from the at least one ridge allowing the lead ends to be separated, and a cover position wherein the cap rotates under a bias to cover the female lead connector is disclosed.

Methods for assembling and using the welding lead safety systems are also disclosed herein.

Various objects, features, aspects, and advantages of embodiments will become more apparent from the following detailed description of preferred embodiments of the invention.

BRIEF DESCRIPTION OF THE DRAWINGS

One or more welding lead safety systems, and methods relating thereto are described herein with reference to the following drawings of preferred embodiments, which are intended to illustrate and not to limit the present disclosure.

DETAILED DESCRIPTION OF THE PREFERRED EMBODIMENTS

Figure 6:
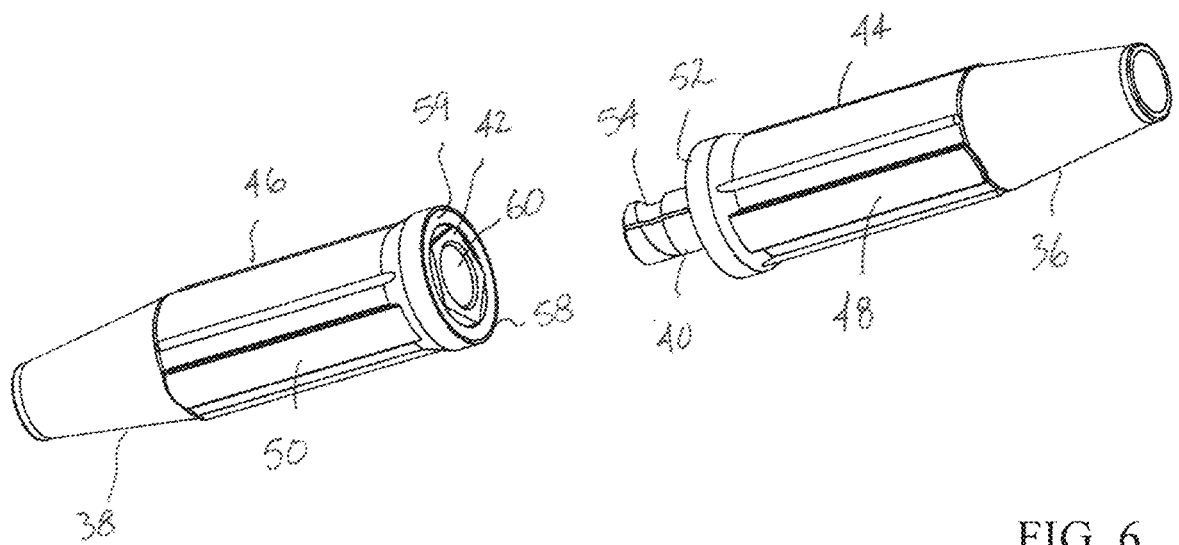
FIG. 6 is a perspective view of a pair of complementary welding leads depicting exposed male and female lead connectors with the welding lead safety system removed.

In general terms and referring initially to FIGS. 1-6, embodiments of one or more welding lead safety systems, and methods of assembling and using such systems are disclosed herein. In the non-limiting examples given below, a welding lead safety system, generally designated 30, incorporates a pair of complementary sleeves 32, 34 that may be used in conjunction with a pair of welding leads (elongated cables not shown) with respective lead ends 36, 38 with one lead end 36 having a male lead connector 40 (FIG. 6) and the other lead end 38 having a complementary female lead connector 42 (FIG. 6). It will be appreciated that the enlarged ends 36, 38 of the welding leads are shown throughout the figures without their elongated cables for ease of description. However, it is understood that the welding leads commonly include a length of conductive cable along with an end section 36, 38 wherein the male and female connectors are accessible at the open or exposed lead ends. The terms lead and lead end may be used interchangeably herein. The exemplary sleeves described herein may be used as a supplemental coupling feature when the lead ends are connected together without interfering with the conventional mating of the male and female lead connectors as well as providing a safety feature when the welding lead ends are separated to eliminate the likelihood of inadvertent arcing from live leads. Such sleeves 32, 34 are also constructed to couple to a variety of welding lead constructions and may be left on the lead ends when not in use rendering the sleeves ready to provide both supplemental coupling and safety features to prevent inadvertent arcing.

With continued reference to FIG. 6, the distal end sections 36, 38 of a pair conventional welding leads are shown and their connectivity to a power source would be readily understood by one of ordinary skill in the art of welding machines and welding related activities. Each welding lead end 36, 38, includes a substantially tubular end section 44, 46, respectively, with a circular outermost surface 48, 50. Typically, such welding leads are insulated with a non-conductive tubing or jacket. The male welding lead end 36 further includes a male lead connector 40 that protrudes beyond the outermost extent 52 of the tubular end section 44. Often, the male lead connector includes a groove 54 for mating purposes with the female lead connector as will be described below.

With continued reference to FIG. 6, the female welding lead end section 46 incorporates the female lead connector 42 with an outermost end 56 recessed slightly interior to the outermost end 58 of the tubular end section 46. The outermost end 58 includes an opening 59 normally exposing the female lead connector 42 and providing access to the male lead connector 42 when the female side lead end is not connected to another cable or welding device or otherwise covered by the welding lead safety system 30 as described herein. In this exemplary embodiment, the female lead connector has a substantially hollow interior 60 at the distal connecting end defined as the end further away from the power source or welding machine (not shown) but may have such construction at both ends of the welding lead, including the end that connects to the power source or welding machine. The interior wall of the female lead connector may include a catch, ridge, or tooth (not shown) constructed to engage the groove in the male lead connector and rotate through the groove as the male and female leads are pressed together and twisted. When fully engaged, the groove 54 and tooth cooperate to resist inadvertent decoupling of the male and female lead ends 36, 38, respectively. However, it is not uncommon that such coupling disengages as the welding leads are twisted or suspended or dropped when attached to a welding implement. The groove and tooth combination also assists in orienting or aligning the male and female leads during the coupling process. Such constructions are common in Tweco system welding lead connectors but this is not meant to be a limiting construction. While the Tweco welding leads are generally more resistant to decoupling, other welding lead constructions are merely plug in coupling types and are even more prone to disconnecting inadvertently. It will be appreciated that the outermost surfaces 48, 50 of the welding lead end sections 44, 46, respectively, are often constructed with a relatively non-slip material.

Referring now to FIGS. 1-10, a first exemplary embodiment of the welding lead safety system 30 is depicted. In this exemplary embodiment, there is a first sleeve, generally designated 32, constructed to releasably couple to the male welding lead end 36 without interfering with the male lead connector 40. The male side sleeve 32 generally includes a circular main body 70 with a hollow center 72 bounded by an inner wall 74 having a smooth surface constructed to slip fit over the outermost surface 48 of the male welding lead end 36 for a snug friction fit. Additionally, the male side sleeve 32 includes a gap 78 extending from a leading edge 80 to a trailing edge 82. Disposed near the leading edge 80 of the male side sleeve 32 are pair of spaced apart front and back throughbores 84, 86 (FIG. 8) for receipt of a pair of threaded fasteners 88, 90, respectively, as best shown in FIGS. 1-2 and 7-8, that are selected to pass through their respective throughbore and engage a threaded coupling component such as a nut 92, 94 (shown best in FIG. 3). Such nuts may also be integrated into the male side sleeve 32. Once the male side sleeve 32 is slid into place on the male welding lead end 36, the fasteners 88, 90 may be tightened to clamp the male side sleeve to further releasably secure the male side sleeve 32 to the male welding lead end 36 by enhancing the frictional resistance between the male side sleeve and the welding lead end. It will be appreciated that the gap 78 and clamping feature allows the male side sleeve to fit a variety of welding lead end diameters instead of having to provide a different male side sleeve for each different sized welding lead end. It will be understood that the main body 70 of the male side sleeve possesses a degree of flexibility to draw opposing sides of the main body together to narrow the gap 78 when tightened on the male welding lead end 36. Furthermore, the opposing sides of the main body may be spread apart to increase the gap 78 to accommodate larger diameter welding lead ends. As an alternative to or in addition to the clamping feature, an axial threaded throughbore may be provided with access on the outermost surface of the male side sleeve and a set screw inserted and screwed therein to abut the outermost surface 48 of the male welding lead end section 44 to also support a releasable coupling arrangement between the male welding lead and male side sleeve. The clamping construction is preferred as such construction generally doesn't degrade the outer surface of the welding lead.

With particular reference to FIGS. 7-10, starting with the leading edge 80 of the male side sleeve 32 and moving toward the trailing edge 82, the first or distalmost section 96 of the male side sleeve 32 includes a defines a generally barrel shaped region that transitions into a sloping surface 98 that tapers upwardly and rearwardly away from the distalmost section toward the trailing edge 82 to define a first ridge or rib 100. At the apex 102 of the ridge, the innermost surface 104 of the ridge projects radially toward the inner wall 74 of the male side sleeve 32. Opposing the first ridge 100 is an outwardly projecting second ridge or rib 106 spaced apart by a capture gap (recess or groove) 108 with a leading edge side wall 110 that is parallel to the innermost surface 104 of the first ridge 100 and also projects radially toward the inner wall 74 of the male side sleeve 32. At the apex 112 of the second ridge, the outermost surface 114 slopes downwardly toward the trailing edge 82. As shown best in FIGS. 7-8 and 10, the capture gap 108 extends circumferentially around a majority portion of the perimeter of the male side sleeve body 70, the purpose of which is explained below.

Figure 1:
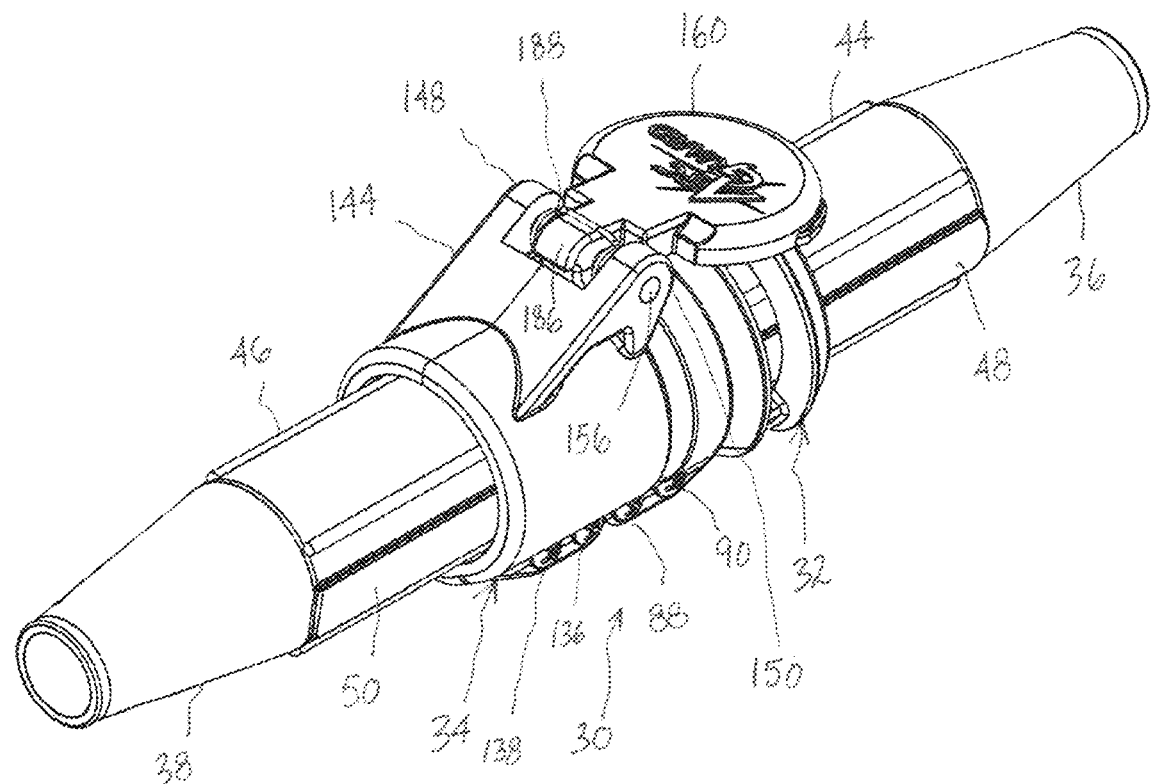
FIG. 1 is a perspective of an exemplary welding lead safety system coupled to an exemplary pair of male and female welding leads and in a mated configuration.
Figure 2:
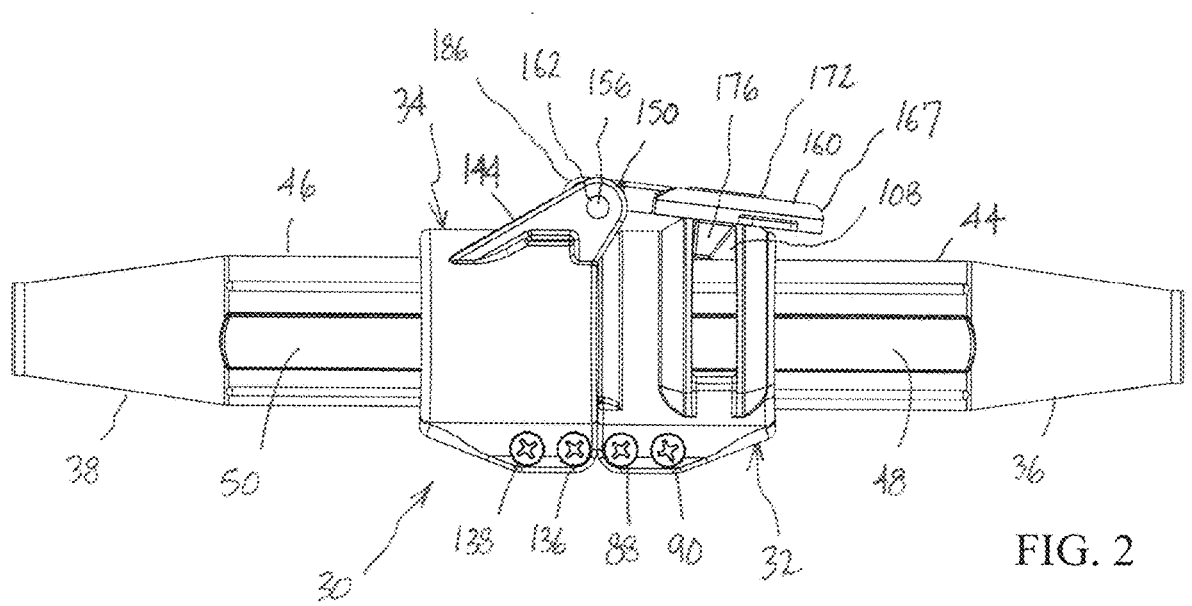
FIG. 2 is a left side view thereof, in reduced scale.
Figure 11:
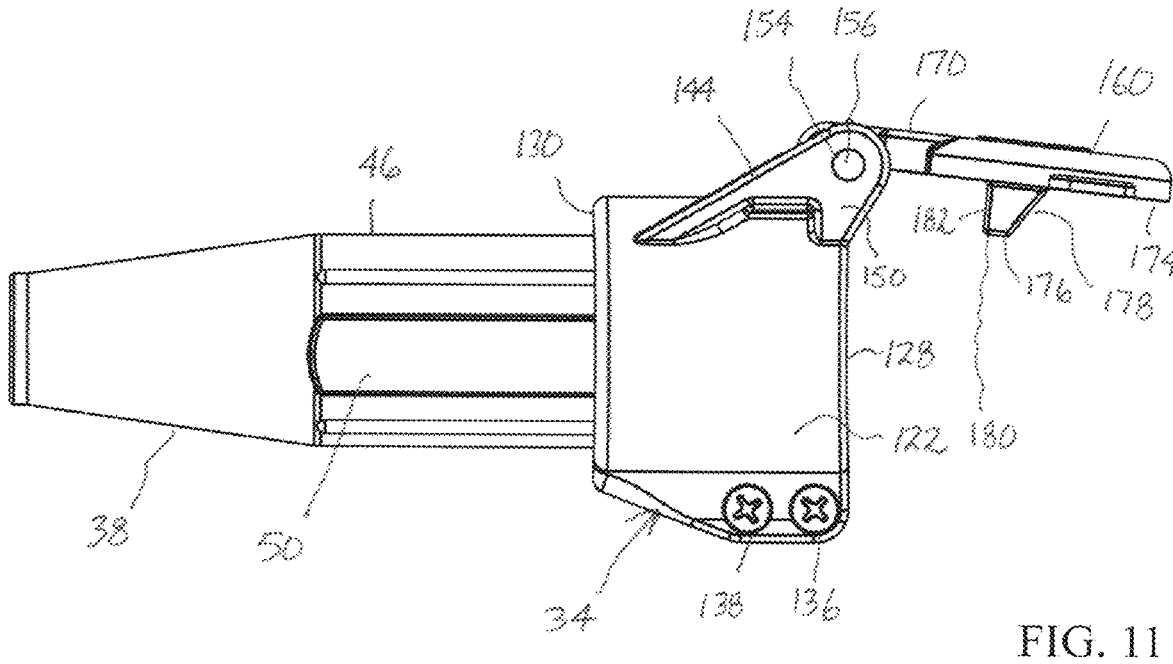
FIG. 11 is a side view depicting the female side welding lead with the female side sleeve of the welding lead safety system of FIG. 1 mounted thereon and the safety cap extending outwardly for entering into either a coupling or a release configuration, in enlarged scale.
Figure 12:
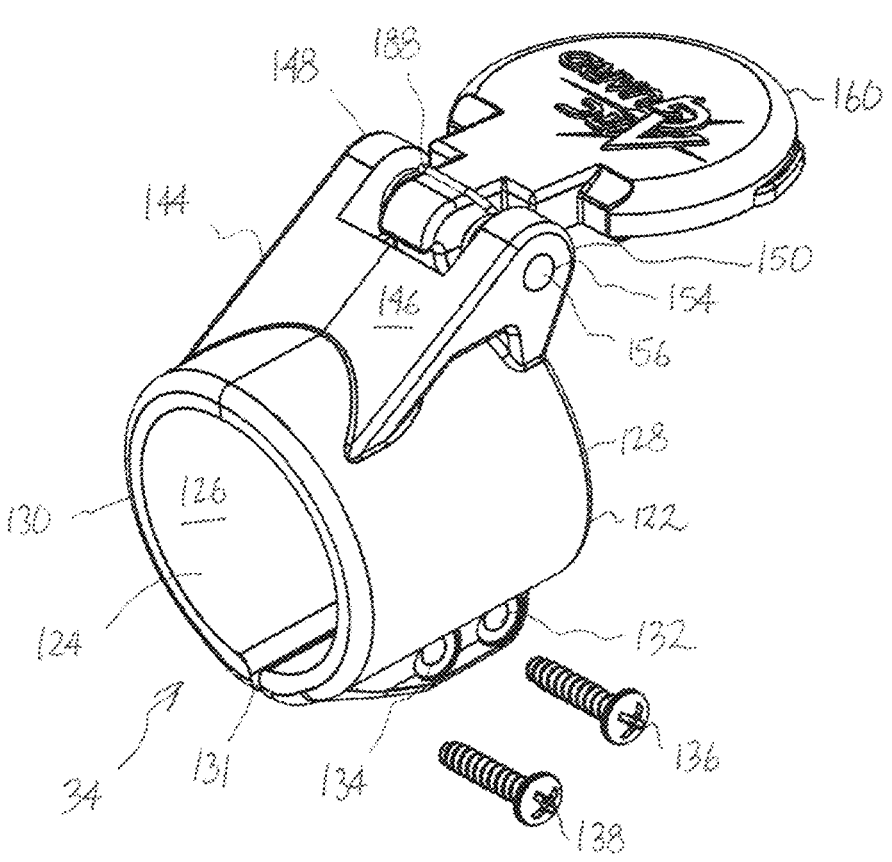
FIG. 12 is a perspective view of the female side sleeve of FIG. 11 of the welding lead safety system without the female side welding lid or safety cap and the fasteners shown apart, in enlarged scale.
Figure 13:
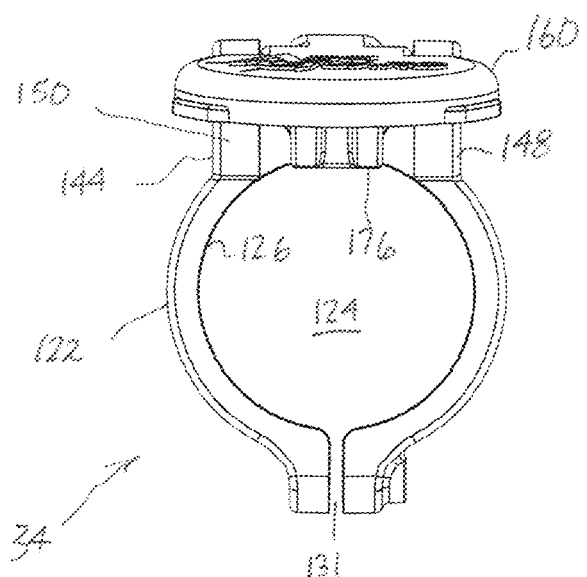
FIG. 13 is a front view of the female side sleeve of FIG. 12, in reduced scale.

Turning now to FIGS. 1-6 and 11-15, the first exemplary embodiment of the welding lead safety system 30 further includes a second sleeve, generally designated 34, constructed to releasably couple to the female welding lead end 38. The second sleeve or female side sleeve 34 includes a similar clamping construction to that the male side sleeve 32. More specifically, the female side sleeve generally includes a barrel shaped main body 122 with a hollow center 124 bounded by an inner wall 126 defining a smooth sidewall constructed to slip fit over the outermost surface 50 of the female welding lead end 38 for a snug friction fit. Additionally, the female side sleeve 34 includes a leading edge 128 and a trailing edge 130. Additionally, the female side sleeve 34 includes a gap 131 extending from a leading edge 128 to a trailing edge 130. Disposed near the leading edge 128 of the female side sleeve 34 are pair of spaced apart front and back throughbores 132, 134 (FIG. 12) for receipt of a pair of threaded fasteners 136, 138, respectively, as best shown in FIGS. 2 and 11-12, that are selected to pass through their respective throughbore and engage a threaded coupling component such as a nut 140, 142 (shown best in FIG. 3). Such nuts may also be integrated into the female side sleeve. Once the female side sleeve 34 is slid into place on exterior surface 50 of the female welding lead end 38, the fasteners may be tightened to add a clamping element to the female side sleeve to further releasably secure the female side sleeve 34 to the female welding lead end 38. As with the male side sleeve 32, the female side sleeve possesses a degree of flexibility to allow the gap 131 to be narrowed or widened to accommodate a variety of female lead end diameters. Alternatively, an axial threaded throughbore may be provided with access on the outermost surface of the male side sleeve and a set screw inserted and screwed therein to abut the outermost surface 50 of the female welding lead end section 46 to also support a releasable coupling arrangement between the male welding lead and male side sleeve. The clamping construction is preferred as such construction generally doesn't degrade the outer surface of the welding lead.

With continued reference to FIGS. 1-4 and 11-15, projecting outwardly from the barrel section 122 of the female side sleeve 34 is a safety cap mounting flange 144 with a ramp section 146 leading to pair of spaced apart arms 148, 150, each with a throughbore 152, 154 (FIGS. 3 and 12), to receive a portion of an axle or pin, generally designated 156 (FIGS. 1-3 and 11).

Turning now to FIGS. 1-4, 11-16 and 19, the axle 156 is constructed to pass through a bore 158 (best seen in FIG. 16) to secure a protective safety (arc preventing) cover, generally designated 160, to the female side sleeve 34 with the outermost ends 162, 164 (FIGS. 2-3) of the axle secured in the opposing arms 148, 150 of the mounting flange 144. The protective safety cover 160 is free to rotate through a two hundred seventy degree angle about the axle 156 and may be disposed in a coupling or capture position (FIGS. 1-3 and 19 for example), a release position (similar to FIGS. 11-15 but may be slightly more raised to elevate the catch element 176 out of the capture gap 108 as explained below), and a covering position (FIG. 18 for example) as will be explained below. However, it will be appreciated that the cap does not need to rotate through the entire two hundred seventy degree arc to assume all three positions and the overall rotation of the safety cap 160 relative to the female side sleeve main body 122 about the axle 156 may be considerably less than two hundred seventy degrees. For example, a rotation arc between approximately a ninety to an approximately one hundred ten degree angle may be sufficient for the cap to move between the covering and release positions, although this is not meant to be limiting. The safety cap 160 includes a generally circular section 166 with a circular outer perimeter 168 for the majority of the perimeter that transitions to a narrow neck extension 170 that incorporates the bore 158 for receiving a portion of the axle 156. The circular section includes a top or outermost surface 172 and an opposing bottom or innermost surface 174. The outer surface 172 is relatively flat as is the opposing inner surface 174 except for a catch element, generally designated 176, protruding therefrom. As best shown in FIG. 11, the leading edge 178 of the catch element slopes away from the innermost surface 174 and rearwardly toward the neck extension 170 to terminate in a lowermost plateau 180 that in turn includes a neck extension side surface or trailing edge 182 of the catch 176 that transitions back toward the innermost surface in a substantially perpendicular direction. Also best shown in FIG. 16, the neck extension 170 includes a rounded hump surface 184 to facilitate rotation of the safety cap relative to the main body 122 of the second (female side) sleeve 34. Opposing the hump is a curved region 186 providing a lever that may be depressed by a user to rotate the safety cap 160.

Without a safety cap 160, there is a significant danger of inadvertent arcing if the live end of the female lead connector 42 comes in contact with metal objects causing unwanted sparks creating a potential ignition source which may cause burns, small fires and, in the presence of a concentration of gas or air exceeding the lower explosive limit (LEL) can potentially lead to a catastrophic event and loss of life.

Figure 3:
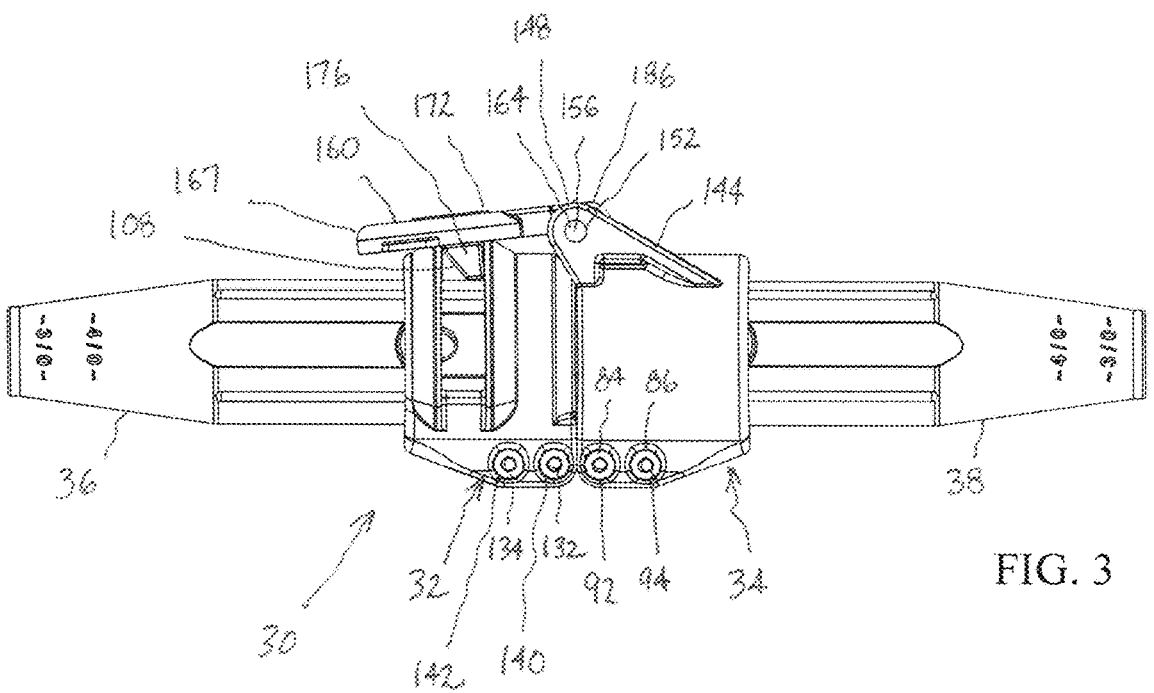
FIG. 3 is a right side view thereof, in reduced scale.
Figure 4:
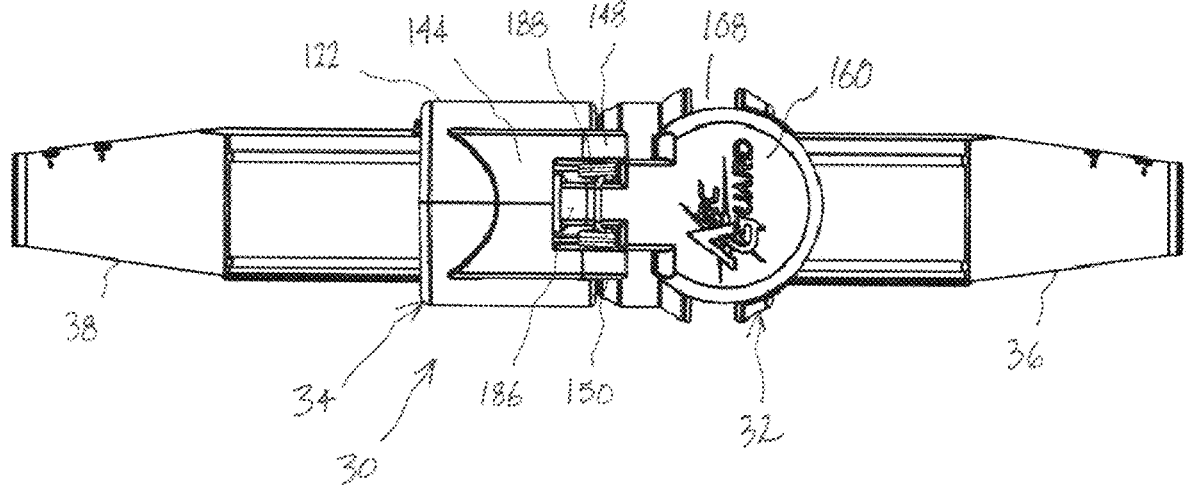
FIG. 4 is a top view thereof, in reduced scale.
Figure 5:
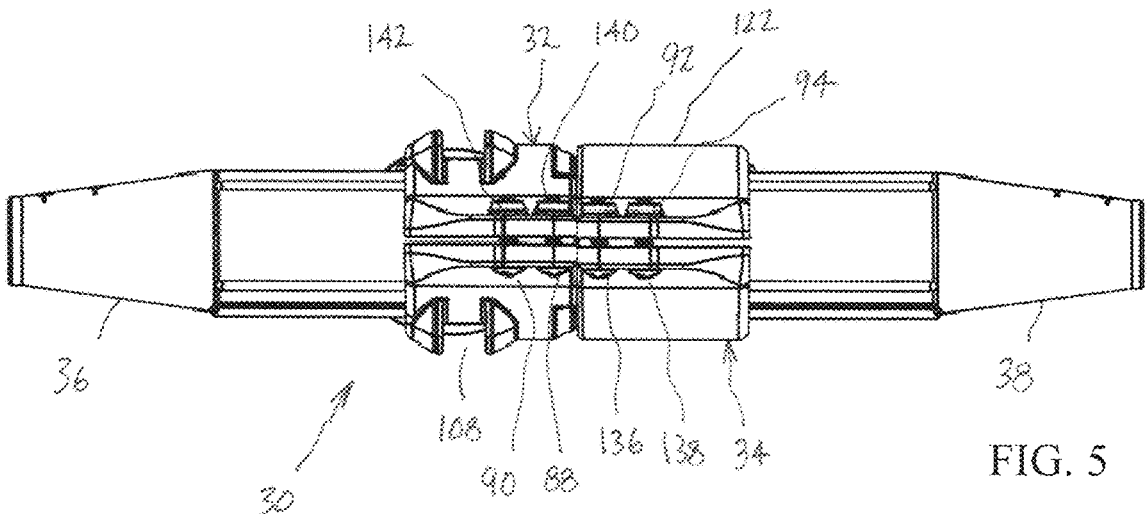
FIG. 5 is a bottom view thereof, in reduced scale.
Figure 14:
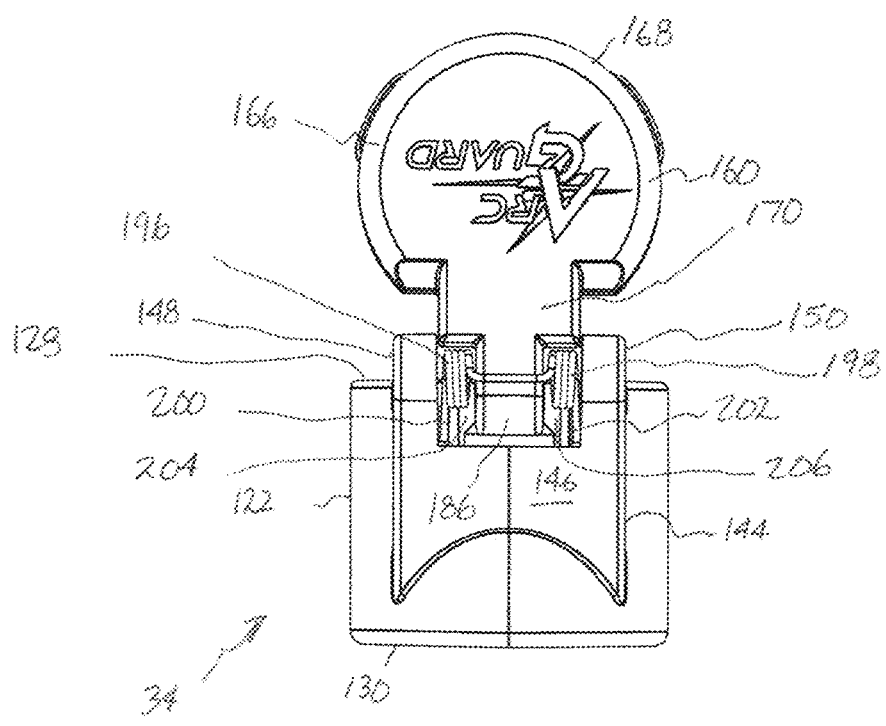
FIG. 14 is a top view of the female side sleeve of FIG. 12, in reduced scale.
Figure 15:
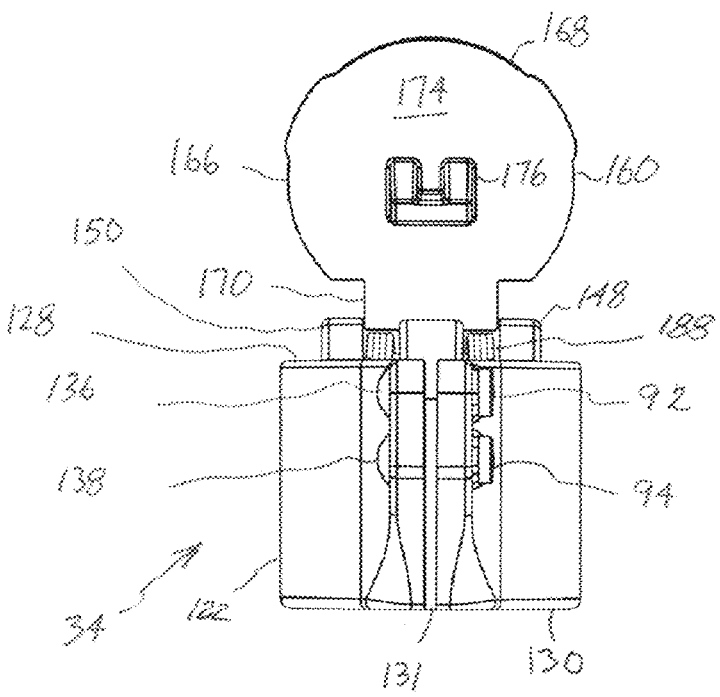
FIG. 15 is a bottom view of the female side sleeve of FIG. 12, in reduced scale.
Figure 16:
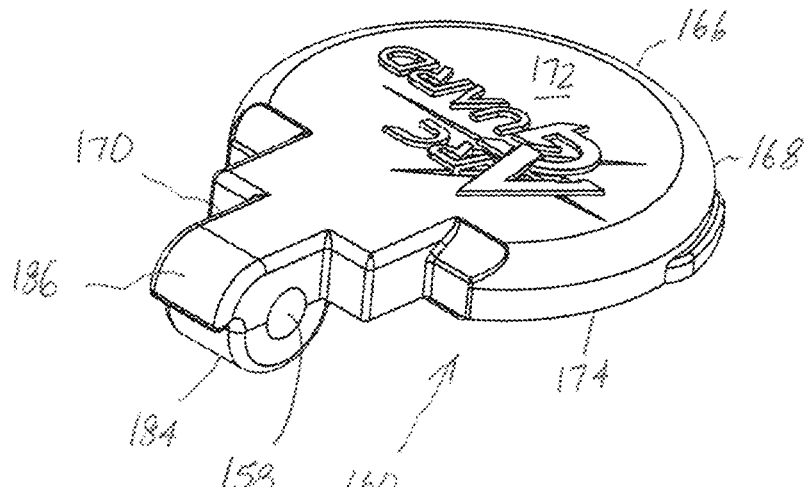
FIG. 16 is a perspective view of the safety cap of FIG. 12 removed from the female side sleeve, in enlarged scale.
Figure 17:
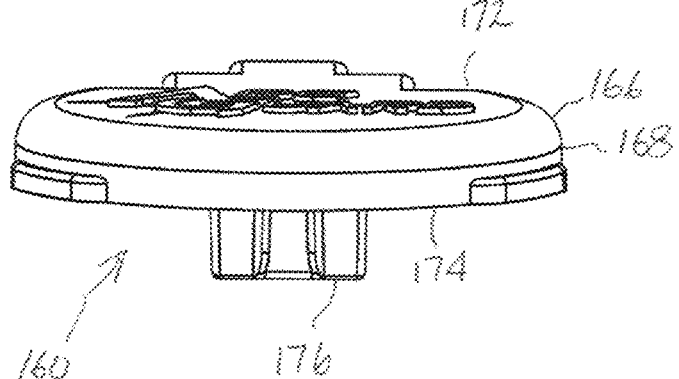
FIG. 17 is a front view of the safety cap of FIG. 16.

Turning now to FIGS. 1 and 4, in addition to the axle element 156, a biasing element 188 that cooperates with the axle 156, mounting flange 144, and/or the main body 122 of the second sleeve to bias the safety cap 160 into a closed position. In this exemplary embodiment, the biasing element is a coil spring such as a dual torsion spring but other biasing elements may be used including, but not limited to, a leaf spring, single torsion spring, wave spring, rubber band, magnet, or other suitable biasing element to bias the safety cap into a closed position while allowing rotation away from such position. In this exemplary embodiment, the biasing element in the form of a torsion spring includes a straight section 194 spanning across the narrow neck region 170 with a coil section 196, 198 to either side of the narrow neck region and wrapped around opposing portions of the axle 156 as best shown in FIGS. 4 and 14. Each coil includes a leg 200, 202, respectively projecting rearwardly and set atop of a corresponding landing 204, 206. With legs 200, 202 resting on their respective landing 204, 206 and the straight section 194 resting atop the narrow neck region 170, the safety cap 160 is biased into the closed configuration as in FIG. 18. The outer end 167 (FIGS. 2-3) of the safety cap is also lower or closer to the welding lead than the rear end 186 (FIGS. 2-3 and 16) creating an angled outer surface 172 as best shown in FIGS. 2-3, to maintain the outer end of safety cap in closer proximity to the outer surface 48 of the welding lead 36 which is useful in preventing inadvertent flipping up of the safety cap 160.

Turning now to FIGS. 20-26, a second embodiment of a welding lead system, generally designated 230, and wherein like components are like numbered, will now be described. Overall, the main difference between this embodiment 230 and the formerly described embodiment 30 is the direct integration of a pair of safety couplers 232, 234 into a pair of respective welding lead ends 236, 238 such as by over-molding, adhering, or otherwise directly coupling all or a portion of the safety couplers to the welding lead end such that at least a portion of the safety couplers are permanently fixed to their respective welding lead ends, that may then be connected to the end portion of a respective welding cable 237, 239 (FIGS. 24-26) inserted into their respective welding lead end 236, 238.

Figure 21:
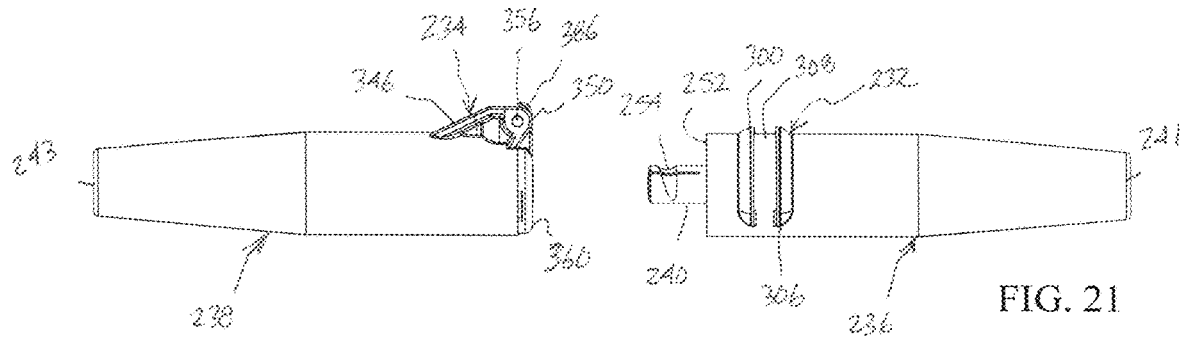
FIG. 21 is a left side view of the welding lead safety system of FIG. 20.
Figure 22:
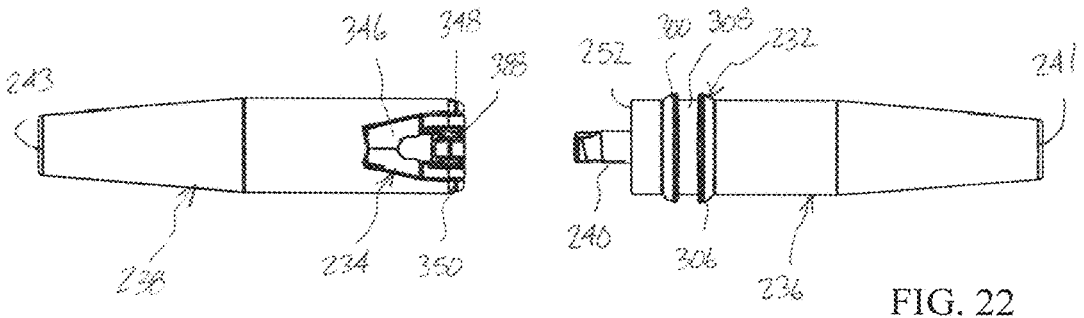
FIG. 22 is a top view of the welding lead safety system of FIG. 20.
Figure 23:
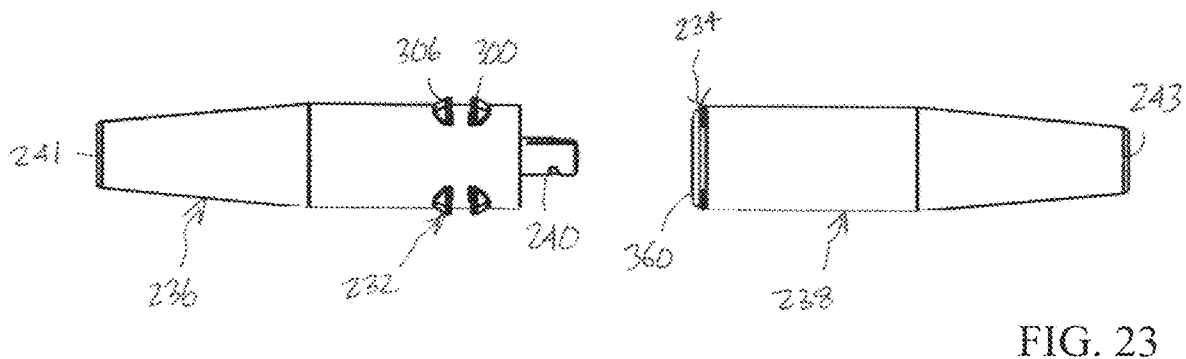
FIG. 23 is a bottom view the welding lead safety system of FIG. 20, in reduced scale.

The male side safety coupler 232 does away with the main slip on barrel body and clamping features of the prior embodiment and instead provides a pair of opposing first and second ridges 300, 306, respectively. The first or distal ridge 300 is disposed proximate but recessed from the outermost end 252 of the cylindrical male body of the welding lead end 236 while the second or inner ridge 306 is spaced even further away from the outermost end 252 of the welding lead end leaving a capture gap 308. In this example, the ridges 300, 306, extend outwardly and circumferentially around the cylindrically shaped welding lead end 236 but do not completely circumnavigate the entire outer surface of the welding lead end as best shown in FIGS. 21 and 23. As with the prior embodiment, such circumferential shape allows for twisting and untwisting the male and female connectors relative to one another while still maintaining the coupling between the male and female safety couplings 232, 234. Also as with the prior embodiment, the male lead connector 240 extends outwardly beyond the outermost extent 252 of the welding lead end 236 and would be inserted into the female side connector such as a female connector 42 shown in FIG. 6 to complete the connection. The ridges 300, 306 in this embodiment have a similar shape and profile as the ridges 100, 106 in the prior embodiment and the capture gap 308 gap is constructed to receive the catch element 376

(FIG. 25) of the safety cap 360 as with the prior embodiment. In this example, both ridges of the male side safety coupler 232 are permanently fixed to the male welding lead end 236 and extend outwardly from the male side welding lead outermost surface. It will be appreciated that the ridges and capture gap may be recessed into the outermost surface of the welding lead as an alternative.

On the complementary female welding lead end 238, the female side safety coupler 234 is positioned. As with the male side safety coupler, the female side safety coupler does away with the main body and clamping feature and instead affixes the ramp section 346 directly to the outer surface of the cylindrical female body of the female side welding lead end 238. As with the prior embodiment, the ramp section extends outwardly from the cylindrical female body of the female side welding lead 238 into a pair of opposing mounting arms 348, 350 that are constructed in the same manner as with the previously described embodiment and support a pin or axle 356 about which a safety cap or protective cover 360 is pivotally mounted and biased into a closed position (FIG. 20) with a spring element 388. The safety cap 360 is constructed similarly to the safety cap 160 of the prior embodiment and includes a rounded lever 386 (FIG. 21) to facilitate rotation of the safety cap by the user and an interior facing catch element 376 (FIG. 25).

Figure 24:
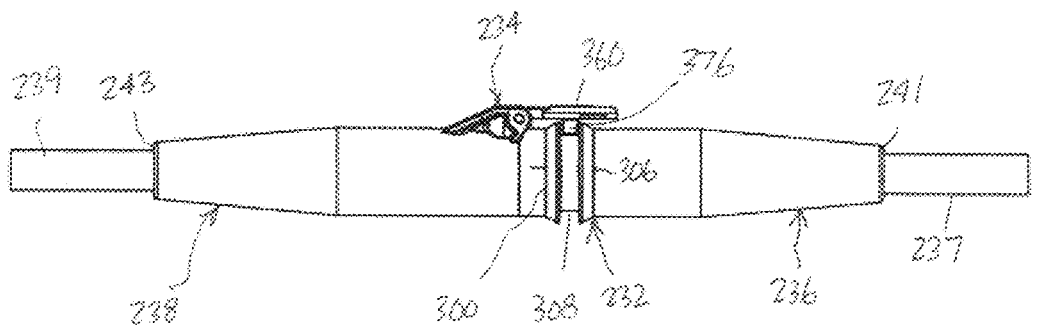
FIG. 24 is a left side view of the welding safety system of FIG. 20 with a portion of a set of welding cables inserted into their respective lead ends that are connected with the safety cap in the coupled position, in reduced scale.
Figure 25:
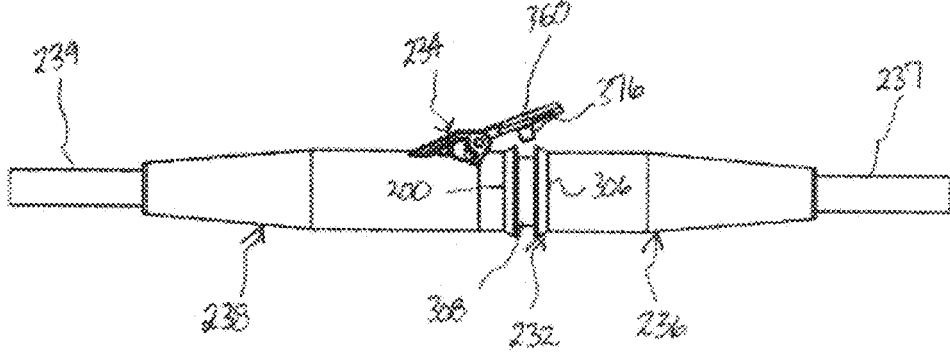
FIG. 25 is a similar view to that of FIG. 24 with the safety cap in the release position.
Figure 26:
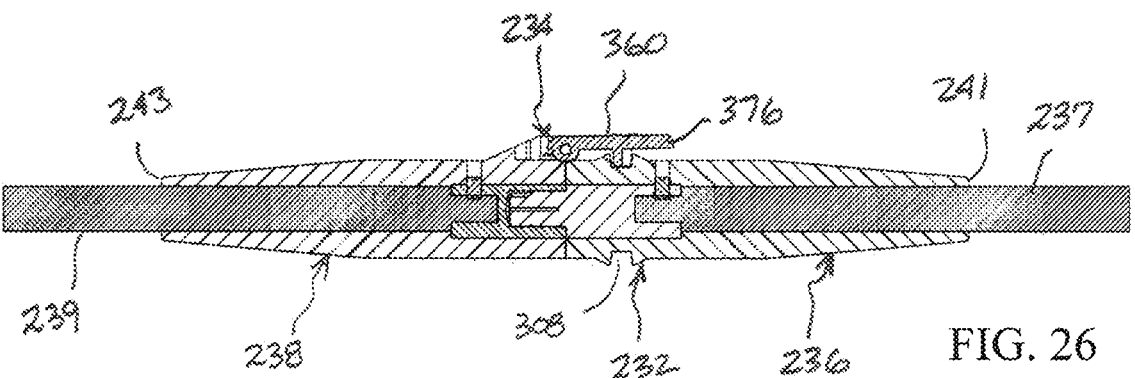
FIG. 26 is a cross-sectional side view of the welding lead safety system of FIG. 24.

With reference now to FIGS. 24-26, the welding lead ends 236, 238 are shown with a portion of a set of welding cables 237, 239 inserted into their respective welding lead ends 236, 238 through the respective open ends 241, 243 (FIGS. 20-26) of the welding lead ends 236, 238. As would be understood by one of ordinary skill in the art, the size of the welding cables 237, 239 is determined and the welding lead ends cut to accommodate the proper size. As shown in FIG. 3 for example, the markings 3/0 and 4/0 indicate where to cut depending on the cable size. Once the cables are inserted into their respective welding lead ends, a set screw for each welding lead end fastens the welding lead ends onto the welding cables as would readily be understood by one of ordinary skill in the art. This process of attaching the welding cables to the welding lead ends is the same for either embodiment disclosed herein.

Materials used: The male side sleeve 32 and the female side sleeve 34 are preferably constructed of a non-conductive, relatively rigid material while possessing a degree of flexibility to accommodate the clamping feature on a variety of welding lead end diameters by expanding or contracting their relative gaps 78, 131. In this case of the male safety coupling 232 and female safety coupling 234 of the second embodiment, the materials used are also preferably of a non-conducting material and also suitable for overmolding, adhering, welding or otherwise affixing at least a portion of the respective coupling 232, 234 to the outer surface of the welding lead ends 236, 238. The spring element and axle may be metallic, coated with a non-metallic material, or constructed of a non-metallic material such as a rigid plastic. Elastomeric materials may also be used.

Figure 7:
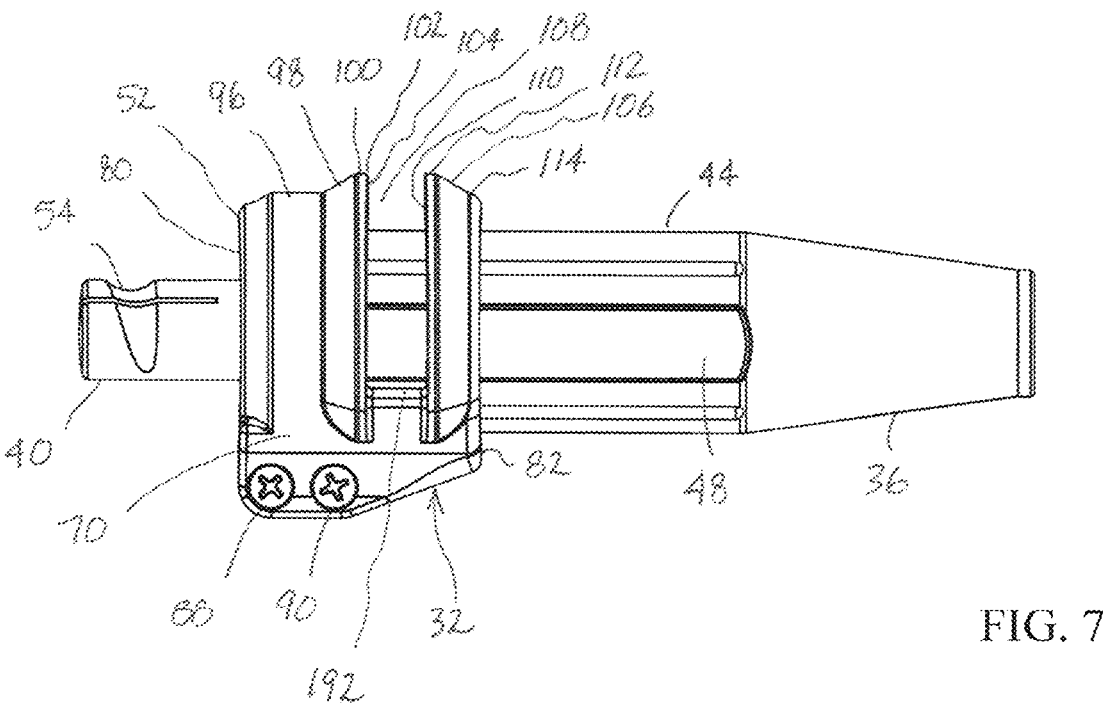
FIG. 7 is a side view depicting the male side welding lead with the male side sleeve of the welding lead safety system of FIG. 1 mounted thereon, in enlarged scale.
Figure 18:
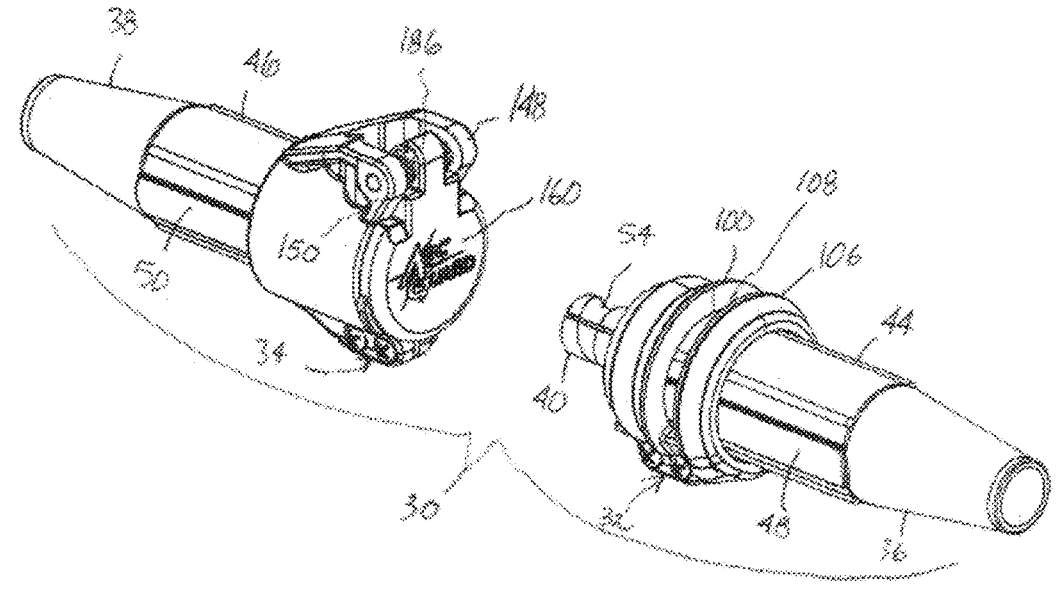
FIG. 18 is a perspective view of the welding lead safety system in a disengaged configuration with the safety cap in a closed configuration.

Use of the Welding Lead Safety System: Referring now to FIGS. 1-19, the individual male side and female side sleeves 32, 34, respectively, of the welding lead safety system 30 may be coupled to a pair of corresponding male and female welding leads ends 36, 38 to prevent both inadvertent separation and, more critically, inadvertent arcing from a live exposed female side connector 42. More specifically, the user may select the male side sleeve 32 and slip the hollow interior 72 of the male side sleeve over the tubular end section 44 of the male welding lead end 32 with the circular inner wall 74 of the main body 70 of the male side sleeve easily slipping across the circular outer surface 48 of tubular end section 46 of the male welding lead end 36. The trailing edge 82 should be slid onto the welding lead end 36 first. The user then positions the leading edge 80 of the male side sleeve to align or substantially align with the outermost extent 52 of the male welding lead so that the two outer surfaces 80 and 52 are flush with one another as best shown in FIG. 7. Once the male side sleeve 32 is well positioned, the user may then insert the two threaded fasteners 88, 90, through their respective through bores 84, 86, to engage a corresponding nut 92, 94 on the opposing side of the male side sleeve. Turning the threaded fasteners reduces the gap 78 and further clamps the male side sleeve in place on the tubular end section of the male welding lead end as shown in FIG. 7. It will be appreciated that the male lead connector 40 protrudes beyond the aligned ends of the male side sleeve and the tubular lead outermost end 52. In similar fashion, the female side sleeve 34 is slipped over the tubular end section 46 of the female welding lead end 38 and clamped in place using the corresponding threaded fastener 136, 138, and nuts 140, 142 with the leading edge 128 of the female side sleeve 34 flush with the outermost extent 58 of the tubular end section 46 of the female welding lead end 38. Due to the incorporation of the biasing element 188, the protective safety cap 160 is initially biased into a closed position covering the opening 59 of the female welding lead end 38 with the interior surface 174 of the safety cap closing off access to the female lead connector 42 thus preventing an inadvertent arcing event as best shown in FIG. 18. It will be appreciated the outer perimeter dimension of the protective cap 160 is selected to completely close off the opening 59 of the female welding lead end and close off all access to the female lead connector 42 when in the closed configuration as in FIG. 18. In addition, the catch 176 is positioned within the interior surface 174 of the protective cap to nest inside the opening 58 of the female welding lead and preferably without touching the sides of the female lead connector, although the cap and catch are preferably constructed of a non-conductive material and thus do not pose an arcing concern even if contacting the female lead connector.

With both sleeves 32, 34 releasably secured on their respective welding lead ends 36, 38, with the male welding lead 36 initially separated from the female welding lead 38, the two leads may be brought together and engaged to establish a connection. More specifically, the user depresses the lever surface 186 (FIGS. 1, 16 and 19) on the rear edge of the neck region 170 of the protective cap 160 to rotate the protective cap out of a closed position (FIG. 18) to an elevated pre-engagement position essentially parallel to or raised above the outer surface of the main body 122 of the female side sleeve 34 as best shown in FIG. 11. The protective cap is initially held in elevated position. If using Tweco style lead connectors, the user then aligns the tooth (not shown) of the female lead connector with a first portion of the groove 54 in the male lead connector and then presses and twists the two lead connectors together to drive the tooth further along the groove 54. As the two lead connectors are pressed and twisted together, the male side sleeve 32 is driven closer to the female side sleeve 34. As the sleeves 32, 34 are moved closer to an abutting orientation, the angled front edge 178 of the catch 176 is driven against the sloping front edge 98 of the first ridge 100 of the male side sleeve 32 and up and over the apex 102 of the first ridge. Then, under the influence of the biasing element 188 and with the user's finger removed from or otherwise exhibiting no influence on the curved lever surface 186, the catch 176 drops into the capture gap 108 of the male side sleeve 32.

The biasing element 188 maintains the catch 176 within the capture gap 108. In this position, the flat surface 182 rests against the flat rear surface 104 of the first ridge preventing inadvertent decoupling without first lifting the catch 176 out of the capture gap 108 as best shown in FIGS. 1-3 and 19 depicting the welding lead coupling or engagement position. If the male and female connectors 40, 42 are not of a twisting construction, then the twisting motion may be omitted during the connecting process and the leads ends 32, 34 merely pressed together to connect the male and female lead connectors. It will be appreciated that, once the catch 176 is disposed above the first section 96, the catch may be released. The angled catch will slide along the male side sleeve outermost surface and up and over the first ridge to drop into the capture gap 108 as the male side sleeve and female side sleeve are brought together under the influence of the biasing element 188. A clicking noise may emit to let the user know the male side sleeve and female side sleeve are releasably coupled together.

Figure 8:
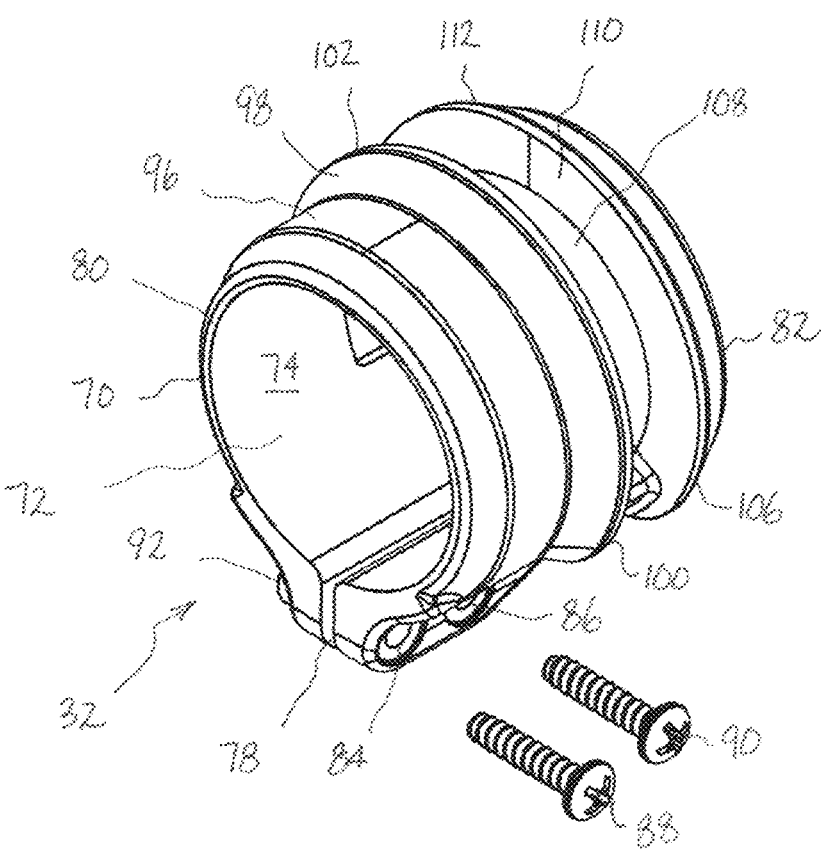
FIG. 8 is a perspective view of the male side sleeve of FIG. 7 of the welding lead safety system separated from the male side welding lead and with the fasteners shown apart, in enlarged scale.
Figure 9:
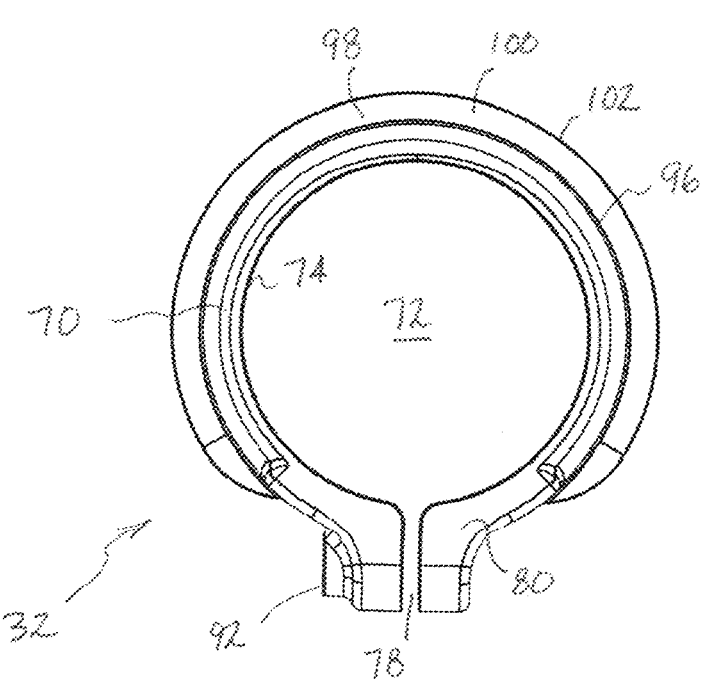
FIG. 9 is a front view of the male side sleeve of FIG. 8.
Figure 10:
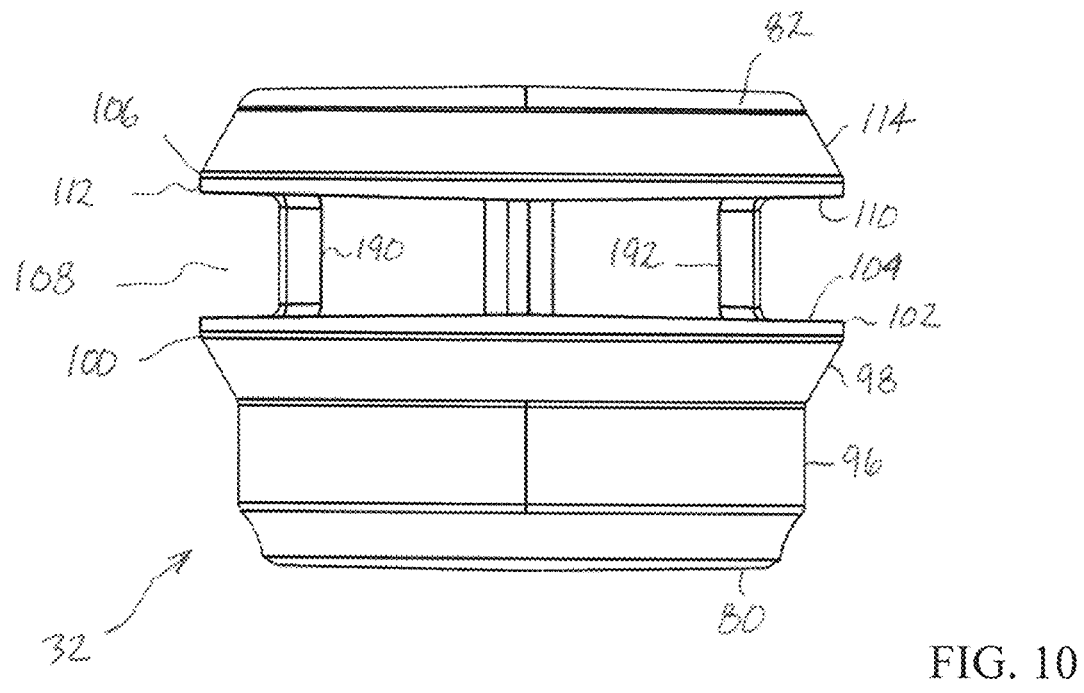
FIG. 10 is a top view of the male side sleeve of FIG. 8.
Figure 19:
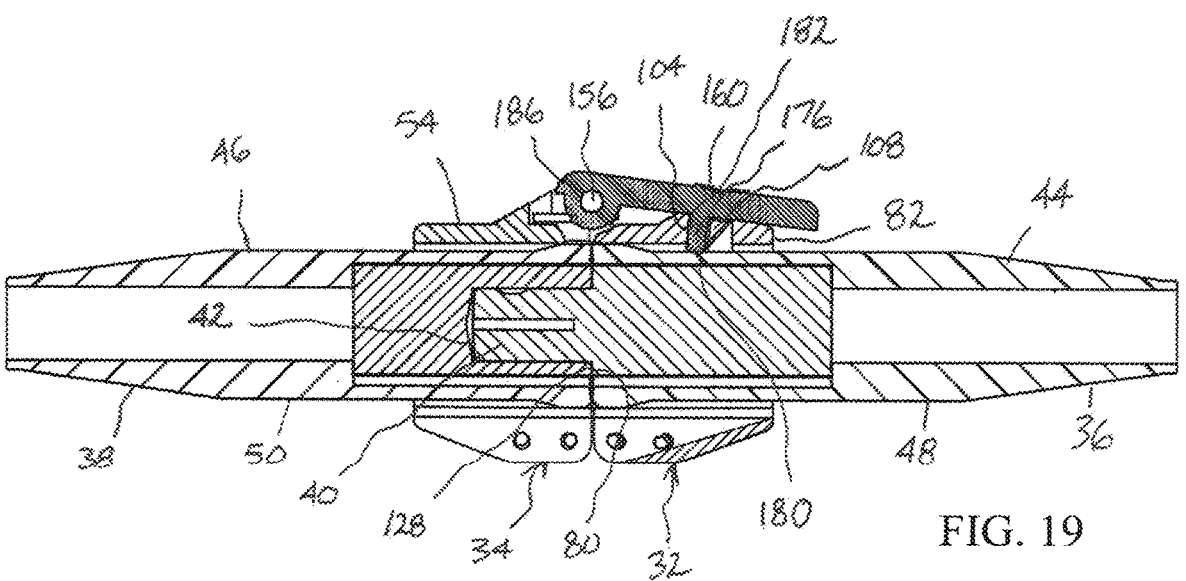
FIG. 19 is a cross-sectional view taken through a transverse centerline of the welding lead safety system deployed in a coupled configuration with the safety cap engaged with the male side sleeve.

With continued reference to FIGS. 7-8 and 10, the purpose of the substantially circumferential capture gap 108 about the main circular body 70 of the male side sleeve 32 will now be explained. As the male lead connector 40 and female lead connector 42 are twisted together, the large circumferential arc of the capture gap 108 accommodates such twisting motion. For example, the catch element 176 may initially drop into the capture gap at one extent and then rotate circumferentially within the capture gap to the other extent or somewhere in between. It will be appreciated that the extents 190, 192 (FIG. 10) may act as opposing rotation stops. The width of the capture gap accommodates both the twisting motion and drawing together of the male and female lead connectors 40, 42. With the protective cap 160 engaged, decoupling of the male and female lead connectors 40, 42 is further inhibited as a backup to the groove and tooth engagement in the male and female lead connectors or as the sole inhibitor of a premature or unwanted disconnection such as may occur when the welding leads or twisted an attached device is suspended or dropped. This decoupling structure is even more critical for welding leads having only plug in connectors without the tooth and groove construction so that no twisting is required to engage the lead connectors. In the coupled orientation, the leading edge 80 of the male side sleeve 32 and the leading edge of 128 of the female side sleeve are abutting one another as shown in FIG. 19.

To disengage the welding lead connectors 40, 42 from one another, the user again depresses the lever 186 of the protective cap to overcome the biasing element 188 and lift the catch 176 out of the capture gap 108. Once the catch element 176 clears the capture gap 108 and the bottom plateau 180 clears the first ridge apex 102, the welding lead ends 36, 38 may be disconnected thereby disengaging the male lead connector 40 from the female lead connector 42 with a twisting motion to disengage the tooth from the groove 54. Once the tooth is freed from the groove, the ends of the welding leads 36, 38 may be separated from one another with a pulling motion. If the lead connectors are of a simple plug variety, then only a pulling motion is needed to separate the lead connectors once the catch is free of the capture gap. As separation of the lead connectors is occurring, the protective cap 160 under the influence of the biasing element 188 snaps downward to close off the open end 192 of the female welding lead 38, again preventing an inadvertent arcing event. The engagement and disengagement processes may be repeated as needed.

It will be appreciated that, once the male side sleeve 32 and female side sleeve 34 are mounted on their respective welding leads 36, 38, there is no need to reposition the sleeves and the sleeves may be coupled and uncoupled as often as needed. Moreover, the protective cap may be rotated from the closed position to the pre-engagement position to the coupled configuration over and over again providing a repeatable coupling backup and safety feature for the associated pair of welding leads. It will further be appreciated that the welding lead safety system can accommodate both lead connectors that twist together or simply push together. The fasteners and nuts may be built into the sleeves 32, 34 or inserted separately. The smooth bore 60, 126 of the respective sleeves 32, 34 along with the flexible clamping capability of each sleeve ensures that the welding lead safety system 30 may be used across a variety of welding lead constructions and diameters.

It will also be appreciated that the coupling feature using two complementary sleeves 32, 34 prevents inadvertent decoupling of the male and female welding lead connectors such as may commonly occur when the welding tool is dropped or otherwise suspended vertically. In contrast, a single piece system connected to only one of the leads depends completely on the connection between the male and female lead connectors which often disengage when twisted or dropped leading to an inadvertent disconnect event.

It will be appreciated that the sleeves 32, 34 of the welding lead safety system 30 may be sold as a kit or unit together with their respective fasteners. Such kit may or may not include the welding leads. The kit may also come with the sleeves pre-mounted on the welding leads. Likewise, the welding lead ends 236, 238 may be sold as a kit with or without welding cables.

Figure 20:
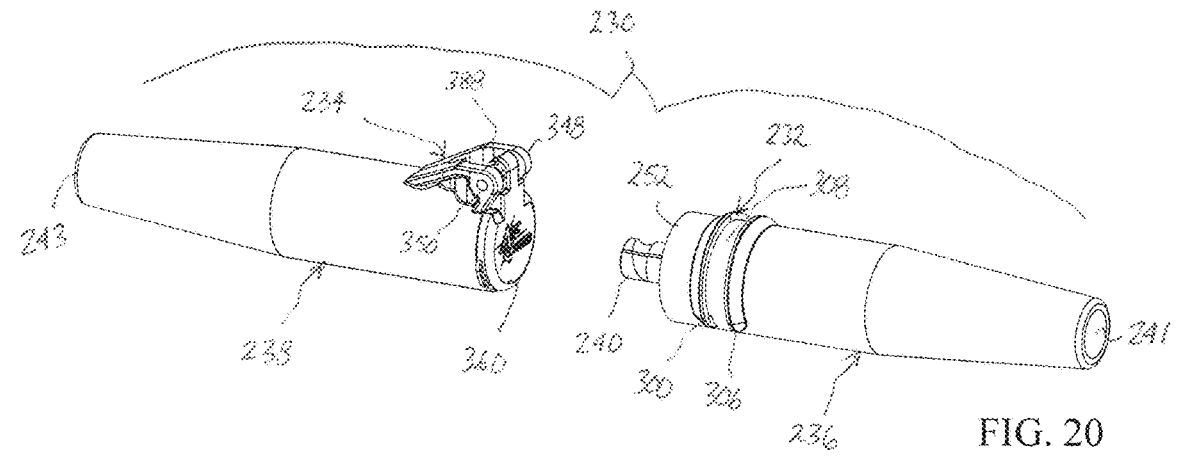
FIG. 20 is a perspective view of a second embodiment of a welding lead safety system shown in a disconnected closed safety position and without the welding cables.

Operation of the second embodiment 230 shown in FIGS. 20-26, for example, is essentially the same except that the safety couplings 232, 234 are already provided on their respective welding lead ends 236, 238 and thus no slip fit positioning and subsequent clamping steps are required. As shown in FIG. 20, the welding lead ends 236, 238 are disconnected and the safety cap 360 is in the closed position similar to FIG. 18 for the first embodiment 30. As shown in FIGS. 24 and 26, the welding lead ends are connected and the safety cap is in a coupled position with the catch element 376 disposed within the capture gap 308. The welding lead ends may be rotated relative to one another but not pulled apart in this configuration. As shown in FIG. 25, the safety cap 360 has been elevated to withdraw the catch element 376 from the capture gap 308 into a release position allowing for separation of the welding lead ends 236, 238. As with the prior embodiment, the safety cap is biased toward a closed position (FIG. 20) or capture position (FIG. 24) and must be actuated by the user to enter into a release position (FIG. 25) from the capture position adding a backup safety feature to the conventional coupling of welding lead ends. The welding cables 237, 239 (FIGS. 24-26) may be connected to their respective welding lead ends 236, 238 at any time during this process as would be understood by one of ordinary skill in the art.

It will be appreciated that the first embodiment of the welding lead safety system 30 is especially useful for retrofitting existing welding lead ends while the second embodiment 230 is more focused on an OEM scenario or aftermarket manufacturing process modifying existing welding lead ends wherein the welding lead ends may be sold in sets with their respective safety couplings 232, 234 already affixed thereto. The user may then add and secure welding cables of a size and length to their liking.

In the exemplary embodiments 30, 230 described herein, a pair of opposing ridges are employed with a capture gap therebetween. However, it will be appreciated that a single ridge for engaging the catch element of the safety cap may be sufficient to establish enough resistance to prevent inadvertent decoupling of the lead connectors and associated lead ends. As an alternative to the outwardly extending ridge or ridges, a depression or recess extending at least partially into the lead connector body may also be used to engage the catch of the safety cap. As another alternative, an outwardly extending catch or boss may be disposed on the male side welding lead with the safety cap incorporating a recess or well for receiving at least a portion of the catch. The length of a circumferential extension of a ridge or depression may be based on the degree of twisting motion normally required to engage the male and female lead connectors.

Certain objects and advantages in conjunction with the embodiments are described herein. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure.

It is also contemplated that various combinations or sub-combinations of the specific features and aspects of the embodiments may be made and still fall within the scope of the invention. Accordingly, it should be understood that various features and aspects of the disclosed embodiments may be combined with or substituted for one another in order to form varying modes of the disclosed invention. Thus, it is intended that the scope of the present invention herein disclosed should not be limited by the particular disclosed embodiments described above.

What is claimed is:

1. A welding lead safety system for use with a female welding lead with a recessed substantially hollow female lead connector and a complementary male welding lead with a protruding male lead connector comprising:

a cylindrical first sleeve constructed to slip fit over the male welding lead and be releasably fixed in place along an exterior surface of the male welding lead, the first sleeve including a capture gap circumferentially extending around at least a portion of an outermost perimeter of the first sleeve;

a complementary second sleeve constructed to slip fit over the female welding lead and be releasably fixed in place along an exterior surface of the female welding lead; and a cap pivotally secured to the second sleeve, the cap including a catch extending therefrom, the cap further being movable between a capture position wherein the catch at least partially resides within a portion of the capture gap restricting the first and second sleeves from being drawn apart once connected together, a release position wherein the catch resides outside the capture gap allowing the first and second sleeves to be connected or disconnected, and a cover position wherein the cap rotates under a bias to rest against a portion of the second sleeve and cover an opening of the female welding lead when the second sleeve is disposed thereon.

2. The system of claim 1 wherein:
the first sleeve is releasably fixed to the male welding lead at a predetermined position along a length of the male connector welding lead; and
the second sleeve coupling releasably fixed to the female welding lead at a predetermined position along a length of the female welding lead allowing the catch to enter a portion of the capture gap when the welding leads are joined and abutting together to secure the welding leads together wherein the leads cannot be inadvertently pulled apart unless the catch is affirmatively withdrawn from the capture gap.

3. The system of claim 1 wherein:
the capture gap on the first sleeve is defined by a pair of spaced apart ridges with the capture gap extending at least partially around an outer circumference of the first sleeve.

4. The system of claim 3 wherein:
the spaced apart ridges include a leading edge ridge with an apex having one side radially projecting toward a hollow interior of the first sleeve to define a leading edge of the capture gap and a second side tapering downwardly and outwardly toward an outermost end of the first sleeve.

5. The system of claim 4 wherein
the catch is constructed to slide along an outermost surface of the first sleeve and raise one end up as the catch slides over the second side of the leading edge ridge and drop into the capture gap disposing at least one surface of the catch against the leading edge of the capture gap as the first and second sleeves are brought together.

6. The system of claim 1 wherein:
the cap is biased toward the cover position by a torsion spring at least partially wrapped about an axle extending through the cap to pivotally connect the cap to the second sleeve.

7. The system of claim 6 further including:
the cap is constructed to rotate through a two hundred seventy degree arc to selectively assume the cover position, the capture position, and the release position.

8. The system of claim 1 wherein:
the first sleeve includes a clamping gap spanned by at least one fastener constructed to clamp the first sleeve to the male welding lead.

9. The system of claim 8 wherein:
the second sleeve includes a clamping gap spanned by at least one other fastener constructed to clamp the second sleeve to the female welding lead.

10. The system of claim 9 wherein
the fasteners are screws.

11. The system of claim 1 wherein:
with the second sleeve releasably coupled to the female welding lead, an interior surface of the cap abuts an outermost edge of the female welding lead when the cap is in the cover position with the catch at least partially disposed within a set of opposing sides in a hollow portion of the female lead connector without touching the opposing sides of the female lead connector.

12. The system of claim 1 wherein:
an outer extent of the first sleeve abuts an outer extent of the second sleeve when the two sleeves are releasably coupled together with the cap in the capture position.

13. The system of claim 1 wherein:
with the second sleeve releasably coupled to the female welding lead, the cap completely seals off access to the female lead connector within the female welding lead when in the cover position.

14. The system of claim 1 wherein:
with the second sleeve releasably coupled to the female welding lead, the cap exposes the female lead connector when rotated away therefrom.

15. The system of claim 1 wherein:
the two sleeves abut one another and the cap rests atop a portion of the second sleeve with the catch residing at least partially within the capture gap of the first sleeve when the female and male welding leads are releasably coupled together in an abutting arrangement.

16. The system of claim 1 wherein:
the capture gap projects circumferentially about the first sleeve and includes at least one stop allowing the male lead connector to be rotated through a rotational arc relative to the female lead connector when the sleeves are releasably coupled to the male and female welding leads and brought together.

17. The system of claim 1 wherein:
the cap includes a lever constructed to be responsive to a depressing motion to flip the catch of the cap out of the capture gap when engaged.

18. The system of claim 1 wherein:
the capture gap on the first sleeve includes a leading edge and a trailing edge, with the outermost extent of both edges sloping downwardly away from the capture gap; and
the catch is constructed to slide up along a leading edge slope and drop into the capture gap by under tension from the spring as the two sleeves are brought together.

19. A welding lead safety system for use with a female welding lead with a recessed substantially hollow female lead connector and a complementary male welding lead with a protruding male lead connector comprising:
a cylindrical first sleeve having a substantially hollow main body constructed with an exterior circumference and a smooth interior circumference, the first sleeve constructed to slip fit over the male welding lead and be releasably fixed in place with a first fastener to releasably retain the first sleeve on the male welding lead at a predetermined position along an outermost surface of the male welding lead, the first sleeve including a capture gap bounded by a pair of opposing ridges and circumferentially extending around at least a portion of an outermost perimeter of the sleeve;
a complementary second sleeve having a substantially hollow main body constructed with an exterior circumference and a smooth interior circumference, the second sleeve constructed to slip fit over the female welding lead and be releasably fixed in place with a second fastener to releasably retain the second sleeve on the female welding lead at a predetermined position along an outermost surface of the female connector welding lead; and
a cap with a biasing element pivotally secured to the second sleeve about an axle passing through a pair of mounting arms extending from the main body of the second sleeve, the cap including a catch extending therefrom and constructed to be releasably disposed within a portion of the capture gap and remaining within the capture gap as the first sleeve is rotated relative to the second sleeve, the cap further being movable between a capture position wherein the catch at least partially resides within a portion of the capture gap restricting the associated lead connectors from being drawn apart once connected together, a release position wherein the catch resides outside the capture gap allowing the lead connectors to be separated, and a cover position wherein the cap rotates under a bias to cover an opening of the female lead connector.

20. A welding lead safety system kit for use with a male welding lead with a protruding male lead connector and a female welding lead with a recessed substantially hollow female lead connector, the kit comprising:

a cylindrical first sleeve with a hollow body constructed to slip fit over an outermost surface of the male welding lead, the first sleeve including a capture gap surrounded by a pair of ridges circumferentially extending around at least a portion of an outermost perimeter of the sleeve;

at least one fastener constructed to releasably retain the first sleeve in place about the male welding lead at a predetermined position along the male welding lead;

a complementary second sleeve having a hollow body with an open leading edge surface constructed to slip fit over an outermost surface of the female welding lead, the second sleeve including a cap pivotally secured to the hollow body and constructed to rotate through a closed position, a coupling position, and a release position, with the cap being biased toward the closed position to dispose an interior surface of the cap against the leading edge surface to completely cover the female lead connector when mounted thereon, the cap including a catch extending from the interior surface and constructed to ride up and over at least one ridge and drop into the capture gap to assume the coupling position restricting the associated lead connectors from being drawn apart once connected together; and at least one other fastener constructed to releasably retain the second sleeve in place about the female welding lead at a predetermined position along the female welding lead.

21. A welding lead safety system comprising:

a first welding lead end having a cylindrically shaped male body with a male connector side end having a male lead connector protruding therefrom and an opposing open end constructed to receive a cable insert, the first welding lead end further having at least one ridge extending outwardly from an outermost circumferential surface of the male body and recessed from the outermost extent of the male connector side end and circumferentially extending around at least a portion of the male body, and a second welding lead end having a cylindrically shaped female body with an open female connector side end exposing a substantially hollow female lead connector and an opposing open end constructed to receive a separate cable insert, the second welding lead end including at least one mounting arm permanently affixed to the outermost surface of the female body and extending outwardly therefrom; and a cap with a biasing element pivotally secured to the at least one mounting arm, the cap including a catch extending therefrom and constructed to be releasably disposed in a locking engagement with the at least one ridge and remaining in such locking engagement as the first welding lead end is rotated relative to the second welding lead end, the cap further being movable between a capture position wherein the catch engages at least one surface of the at least one ridge restricting the associated lead ends from being drawn apart once connected together, a release position wherein the catch is free of interference from the at least one ridge allowing the lead ends to be separated, and a cover position wherein the cap rotates under a bias to cover the female lead connector.

22. The welding lead safety system of claim 21 further including:

a second ridge permanently affixed to and extending outwardly from the male body and spaced apart from the first ridge to define a capture gap, the capture gap constructed to releasably receive the catch of the safety cap as the male connector and the female connector are brought together and the catch slides up and over the first ridge; and the catch resides within the capture gap in the capture position, resides outside the capture gap in the release position, and resides within an opening in the female side connector in the closed position.

23. The welding lead safety system of claim 21 wherein:

the at least one ridge extends circumferentially around the male body allowing for the male and female connectors to be twisted together into a locking configuration while maintaining the catch against at least one surface of the at least one ridge preventing separation of the lead ends when the catch is in the capture position.

* * * * *